US012561002B2

(12) United States Patent
Stahl et al.

(10) Patent No.: US 12,561,002 B2
(45) Date of Patent: Feb. 24, 2026

(54) METHOD FOR DETECTING AN OPERATING INPUT, AND OPERATING DEVICE

(71) Applicant: MERCEDES-BENZ GROUP AG, Stuttgart (DE)

(72) Inventors: Volker Stahl, Althengstett (DE); Jörg Reisinger, Löchgau (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 260 days.

(21) Appl. No.: 18/010,843

(22) PCT Filed: Jun. 10, 2021

(86) PCT No.: PCT/EP2021/065653
§ 371 (c)(1),
(2) Date: Dec. 16, 2022

(87) PCT Pub. No.: WO2021/259660
PCT Pub. Date: Dec. 30, 2021

(65) Prior Publication Data
US 2023/0221803 A1 Jul. 13, 2023

(30) Foreign Application Priority Data

Jun. 22, 2020 (DE) ..................... 10 2020 003 713.5

(51) Int. Cl.
G06F 3/01 (2006.01)
G06F 3/042 (2006.01)
(52) U.S. Cl.
CPC ............ G06F 3/016 (2013.01); G06F 3/0428 (2013.01)

(58) Field of Classification Search
CPC .... G06F 3/016; G06F 3/0428; G06F 3/03547; G06F 3/0362; G06F 2203/014
See application file for complete search history.

(56) References Cited

U.S. PATENT DOCUMENTS

2007/0236450 A1    10/2007  Colgate et al.
2010/0156818 A1 *   6/2010  Burrough ............ G06F 3/04883
                                                          345/173

(Continued)

FOREIGN PATENT DOCUMENTS

AT            518774 A4      1/2018
DE    102011112567 A1      3/2013
WO       2013034287 A2      3/2013

OTHER PUBLICATIONS

International Search Report and Written Opinion mailed Sep. 17, 2021 in related/corresponding International Application No. PCT/EP2021/065653.

(Continued)

*Primary Examiner* — Md Saiful A Siddiqui
(74) *Attorney, Agent, or Firm* — PATENT PORTFOLIO BUILDERS PLLC

(57) ABSTRACT

A method for detecting an operating input performed by a finger involves detecting various contact points of a contour of the finger using a sensor system on a sensor surface. The sensor system includes at least one transmitting unit for transmitting a signal to the finger and at least one receiving unit for receiving a signal reflected by the finger. A surface vibration is introduced into the sensor surface by at least one actuator, the surface vibration changes the frictional resistance between the finger and the sensor surface as a function of the changing contact points of the contour of the finger.

12 Claims, 1 Drawing Sheet

(56)          References Cited

U.S. PATENT DOCUMENTS

| | | | |
|---|---|---|---|
| 2011/0248916 A1 | 10/2011 | Griffin et al. | |
| 2013/0307789 A1* | 11/2013 | Karamath | G06F 3/016 |
| | | | 345/173 |
| 2014/0118127 A1* | 5/2014 | Levesque | G08B 6/00 |
| | | | 340/407.2 |
| 2014/0210795 A1 | 7/2014 | Mattes et al. | |
| 2016/0196726 A1* | 7/2016 | Saito | H04M 1/72412 |
| | | | 340/407.1 |
| 2019/0212865 A1* | 7/2019 | Shiroto | G06F 3/016 |
| 2019/0354185 A1* | 11/2019 | Vezzoli | G06F 3/044 |
| 2020/0218351 A1* | 7/2020 | Orita | G06F 3/0446 |
| 2021/0373595 A1* | 12/2021 | Castañeda | G02C 11/10 |
| 2023/0044562 A1* | 2/2023 | Rosenberg | G06F 1/1662 |

OTHER PUBLICATIONS

Office Action created Apr. 1, 2021 in related/corresponding DE Application No. 10 2020 003 713.5.
Office Action dated Nov. 29, 2022 in related/corresponding EP Application No. 21 733 099.2.

* cited by examiner

METHOD FOR DETECTING AN OPERATING INPUT, AND OPERATING DEVICE

BACKGROUND AND SUMMARY OF THE INVENTION

Exemplary embodiments of the invention relate to a method for detecting an operating input performed by at least one finger, as well as to an operating device for carrying out the method according to the invention.

A sensor system for detecting an operating input, as can be employed in the method according to the invention, is known for example from the Applicant's DE 10 2011 112 567 A1. The operating device, described therein, for a motor vehicle comprises a transmitting unit for transmitting a signal to the finger and at least one receiving unit for receiving a signal reflected by the finger. In principle, the type of signal is immaterial, as long as the corresponding signals can be transmitted, reflected by the finger, and received by the sensor system again. In particular, they can be in the form of optical signals, which are then correspondingly captured by a camera, both in the visible range and in the infrared range. Also conceivable are ultrasound signals etc. The sensor system here is designed in such a way that it essentially detects various contact points of a contour of the finger. Such a sensor system is also termed optical finger navigation (OFN) or is designed as a fingerprint sensor, for example.

The advantage is essentially that the finger is not moved on a relatively large surface as with a touchscreen, but is moved and rolled on a relatively small surface. The actual sensor is punctiform or linear, for example in the form of a straight line in the case of a one-dimensional sensor or in the form of two intersecting lines in the case of a two-dimensional sensor.

The disadvantage of such sensors is essentially that the operator cannot receive feedback, or can only receive feedback with difficulty, so that the feedback is typically only realized by the reaction of, for example, a computer to the corresponding input, which makes it necessary, for example, for the person using the sensor to observe a screen if they want feedback.

In addition, US 2019/0354185 A1 describes the generation of a standing wave extending over the entire surface of a touchscreen, for example, and thereby opposes the inherently smooth surface of the touchscreen with different resistances for a finger when swiping over the surface. The inherently smooth surface can be set into a standing vibration in such a way that a user feels a kind of ribbing of alternating wave troughs and crests with the surface of their finger, and can thus more easily associate a certain distance with their movement. The cited specification then additionally uses deformations in the standing wave in order to detect the position of the finger on the touchscreen surface.

Exemplary embodiments of the present invention are directed to further improving a method for detecting an operating input using a sensor in the manner mentioned in the introduction and moreover to specify an operating device suitable for this purpose.

The method according to the invention serves to detect an operating input performed by at least one finger by detecting various contact points of a contour of the finger using a sensor system on a sensor surface. This sensor system has at least one transmitting unit for transmitting a signal to the finger and at least one receiving unit for receiving a signal reflected by the finger. The sensor is thus not designed as a large-area touch-sensitive surface but as a largely punctiform sensor, which correspondingly detects a rolling movement and/or sliding movement of a finger over the sensor, as is the case, for example, with fingerprint sensors or so-called optical finger navigation sensors. This has the advantage that the sensor can be made extraordinarily small and can perceive a movement in one or two dimensions which, in particular, can be perpendicular to each other and thereby allow a two-dimensional movement resolution.

According to the invention, the sensor surface is set into surface vibrations by at least one actuator, by which the frictional resistance between the finger and the sensor surface changes as a function of the changing contact points of the contour of the finger, i.e., ultimately the rolling movement on and/or sliding movement of the finger over the punctiform sensor surface. This makes haptic feedback to the user possible for the first time, as the different friction can be felt or sensed by the finger and provide reliable feedback to the user independently of optical or acoustic signals.

According to one advantageous development of the idea, however, this can also be supported by optical and/or acoustic signals for generating feedback, wherein the haptic feedback is in the foreground in the method according to the invention and is realized by introducing vibrations into the sensor surface.

According to an extraordinarily favorable development of the method according to the invention, it can be provided that the surface vibration is temporally changed in such a way that a sequence of larger and smaller vibration amplitudes and/or frequencies is obtained in the area below the contact points of the finger on the sensor surface. The frictional resistance between the finger and the sensor surface can be changed accordingly via the frequencies or, in particular, the vibration amplitudes, since a sensor surface that is moved further towards the finger by the vibrations opposes the finger with a greater frictional resistance than a surface further away from the finger. This effect can be achieved directly by controlling the vibration amplitudes and, additionally or alternatively, also by changing the frequencies and, for example, the resulting resonance behavior of the sensor surface or parts thereof.

It can be further provided in one very advantageous configuration of the method according to the invention that the change in the surface vibrations in the area below the contact points of the finger is carried out abruptly, continuously, or according to a predefined function, in each case for displaying a desired haptic effect. The haptic sensation is achieved by a different sequence of various frictional resistances or forces during the rolling of the finger on the sensor surface associated with a skimming or sliding movement. Depending on the haptic effect desired, the transition between the individual frictional resistances, and thus ultimately between the vibrations that cause them, can be configured in different ways. For example, abrupt transitions can be generated that simulate the engagement of a button, the movement of a cylindrical rotary switch around a detent, or the like as desired haptic effects. Other effects are easier to realize via ramps or curves of the change of the vibration amplitudes and/or frequencies, for example the simulation of the movement of a trackball, of a joystick with increasing resistance the further the movement goes, or the like.

It can be provided in one extraordinarily favorable development of the method according to the invention that the surface vibrations are changed in such a way that the frictional resistance or frictional forces is/are changed by the rise and fall of vibration amplitudes and/or frequencies in such a way that the effect of a roller rotatable in one or two dimensions with a detent of its rotational movement is haptically recreated. This leads to a very simple and efficient application, such as can be used in the cockpit of a vehicle, for example. A roller can thus be easily and efficiently recreated in the minimal installation space required by the sensor surface. Even while concentrating on the traffic for example, a user can operate this roller, preferably with a detent of its rotational movement, merely via the haptic feedback, in order, for example, to set the brightness level, adjust a headlight range, choose a setting on a multimedia device, make a menu selection, or the like. The design is mechanically extraordinarily simple and robust because no moving parts are required at all. Nevertheless, the haptic feedback made possible for the first time by this form of the method can be used to realize an extraordinarily realistic representation of such a rotatable roller, which is perceived by the user in exactly the same way as they would perceive a mechanical roller. This can be done in one dimension, i.e., with a direction of rotation in only one plane, or also as a two-dimensional roller, which can be moved correspondingly in one direction as well as in the other, for example perpendicular to it.

It can additionally be provided in one extraordinarily favorable development of the method according to the invention that an adaptation of the change in the vibration amplitudes and/or frequencies takes place adaptively on the basis of a path-time diagram of the movement of the contact points of the contour of the finger on the sensor surface. Such an adaptive adjustment of, for example, the magnitude of the vibration amplitudes becomes possible because the sensor records in a sense a path-time diagram of the sliding and/or rolling movement of the contour of the finger on the sensor surface. If this path-time diagram corresponds to the expected movement, for example a movement of a detented roller, then this path-time diagram will approximately follow the intended haptic feedback and thus the sequence generated by the surface vibration. If this is not the case, and if the movement detected via the path-time diagram is not as would be expected by the desired haptic effect, in particular if it is such that the movement of the finger is significantly more uniform than would be expected, then obviously the desired haptic feedback has not been sufficiently perceived by the user. Therefore, by increasing the change in the vibration amplitudes and/or frequencies, the haptic feedback can be made even clearer. If, on the other hand, the movement is excessively strong or choppy, then the haptic feedback can also be reduced in its strength. For example, the change in the vibration amplitude is reduced for this purpose. The change is made adaptively in such a way that ultimately, depending on the user, an adjustment can be made in such a way that the user feels approximately the same haptic feedback depending on the sensitivity of their own fingers, in order to always provide approximately the same haptic feedback to different people through the adaptive adjustment after a short operating time.

As already mentioned above, in addition to the haptic feedback, at least some of the changes in the vibration amplitudes and/or frequencies can be also accompanied by acoustic and/or optical signals. These can be presented, for example, via a loudspeaker in the case of acoustic signals or via optical means such as a display, lighting elements or the like. Preferably, for example, the engagement of the aforementioned roller feedback simulated by the friction characteristic is supported by an engagement sound corresponding to a mechanical roller. In the case of optical signals, it is also conceivable in principle, in the event of optical detection of the finger by emitting visible light, to use this light at the same time for optical feedback, for example by means of additional emission windows in the area of the sensor surface or in areas next to the sensor surface.

The operating device according to the invention for carrying out the mentioned method in one of the configurations now comprises such a sensor system for detecting various contact points of a contour of the finger on the sensor surface, which comprises a transmitting unit for transmitting a signal to the finger and at least one receiving unit for receiving a signal reflected by the finger. It is provided here according to the invention that at least two side edges of the sensor surface are each connected at least indirectly to at least one piezo actuator. These at least two piezo actuators introduce vibrations into the surface of the sensor, which, according to a very advantageous development of the operating device according to the invention, is designed as an optical finger navigation sensor or as a fingerprint sensor. For the first time, it is thus possible to combine haptic feedback directly through the surface of the sensor with a correspondingly small sensor that detects, rather than the finger moving over surface, the finger sliding and/or rolling on the sensor surface. In this way, an operating device can be set up very efficiently in an extremely small installation space, via which, for example, a menu control or the like can be implemented, whereby the direct haptic feedback enables simple, efficient, and largely intuitive operation.

It can be provided in one very advantageous configuration of the operating device according to the invention that two opposite side edges and two side edges of the sensor surface that are perpendicularly opposite thereto are each connected at least indirectly to at least one piezo actuator. This arrangement, in which the perpendicularly opposite side edges of the sensor surface can be stimulated to vibrate via the actuator, now allows the realization of the construction of, for example, a two-dimensional roller of a joystick or the like, already mentioned in the method according to the invention, since the corresponding vibrations can be generated in both surface directions of the sensor surface and different frictional resistances or frictional forces can be opposed to the finger.

According to one very favorable development of the invention, the operating device can moreover provide devices for at least indirectly output acoustic and/or optical signals, so that acoustic or optical feedback becomes possible in addition to haptic feedback. This can be done directly in the area of the sensor, as already descried above for optical feedback by light signals. However, it can also be done indirectly by the sensor indirectly providing the appropriate output, for example by outputting signals to generate acoustic feedback to a media system which correspondingly plays them via the speakers connected to it, especially when used in a vehicle.

The vehicle, which has already been mentioned several times now, is also the preferred intended use of such an operating device and thus of the method described at the beginning according to the invention in one or more of the embodiments shown. There in particular, a small operating device that provides haptic feedback is very advantageous, so that the user can continue to concentrate on the traffic during operation.

BRIEF DESCRIPTION OF THE DRAWING FIGURES

Further advantageous configurations of the method and of the operating device also result from the exemplary embodiment which is set out in more detail below with reference to the figures.

DETAILED DESCRIPTION

Figure 1:
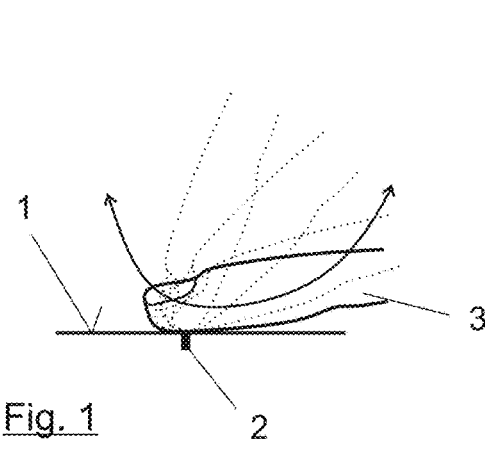
FIG. 1 shows a schematic diagram of a sensor system and its operation.

The diagram in FIG. 1 shows a schematic illustration of a surface 1 with a sensor 2 that detects various contact points of a contour of a finger 3 guided over the sensor 2 essentially in a partly swiping/sliding, partly rolling movement, as indicated by the arrow and the dotted representations of the finger at a later point in time in the movement. Such a sensor 2 is often referred to or used as an optical finger navigation sensor (OFN) or fingerprint sensor. The design and operation correspond in this case to the state of the art. The advantage lies in the possibility of making the sensor 2 correspondingly small, for example linear in the case of a one-dimensional detection or also, in the case of a detection of a movement perpendicular to the plane of the page, correspondingly from two intersecting linear parts. This makes it possible for the sensor surface to be very small.

Figure 2:
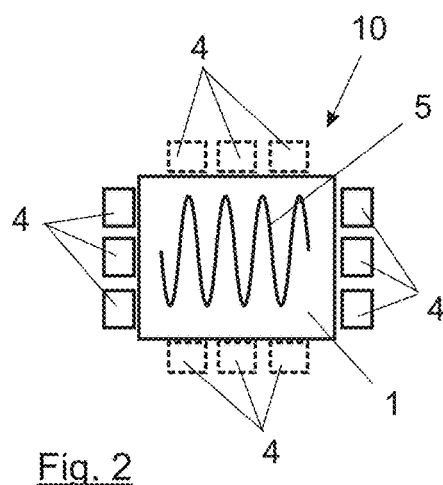
FIG. 2 shows an illustration of the sensor surface with actuators for generating a surface vibration.

In the illustration in FIG. 2, the surface 1 of such an operating device 10 is again schematically indicated in plan view. This surface, hereinafter referred to as sensor surface 1, is provided with corresponding actuators 4—preferably piezo actuators 4—on at least two, preferably all four of its side edges, which can introduce a surface vibration 5, indicated schematically here, into the sensor surface 1 in order to generate different frictional resistances or forces FR when the sensor surface 1 is touched by the finger 3 due to the different vibration states. This enables haptic feedback of the operation of such a sensor system in the structure referred to as operating element 10 as a whole.

In the following, this is to be illustrated using the example of the operation of a roller, purely by way of example in one dimension, wherein in the case of the arrangement of the piezo actuators 4 on all four sides of the sensor surface 1, this can also correspondingly be extended in two dimensions.

Figure 3:
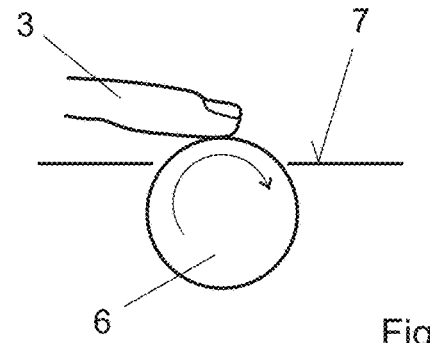
FIG. 3 shows a schematic illustration of operation of a roller with associated force curve.
Figure 3:
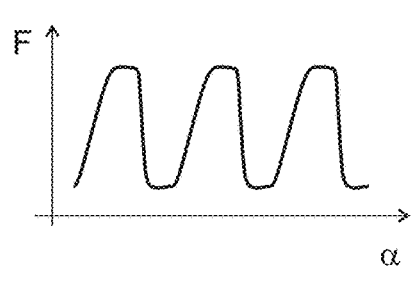

In the illustration in FIG. 3, a roller 6 is indicated by way of example in a surface 7. This is correspondingly moved by the finger 3, for example by rotating it through an angle of rotation a, in particular in the direction of the arrow in the illustration in FIG. 3. The roller 6 itself should have a mechanical detent so that the movement of the roller 6 takes place in individual successive movements, which are interrupted by the respective detent and an associated increase in friction. The resulting force F is shown in the illustration in FIG. 3 on the right in a diagram over the angle of rotation a for three detents, for example. The mechanical design of the roller 6 with its detent thus produces the force curve shown on the right in FIG. 3 over the angle of rotation a which, in the case of a mechanical design, provides direct feedback to the finger 3 and thus ultimately to the user who operates the roller 6 with their finger 3.

This design and the haptic feedback can now be correspondingly recreated by the operating device 10 simply and efficiently, without mechanical components which could wear out. In the illustration in FIG. 4, the finger 3 can again be seen, which is located above the operating device 10 and actuates it in the usual manner as in optical finger navigation, in that the finger 3 is moved here again by way of example in one dimension above the sensor surface 1, in particular is partly swiped and partly rolled. Of the actual sensor system, a transmitting unit 8 for transmitting a signal and receiving unit 9 for receiving the signal reflected by the finger 3 can be seen here below the sensor surface 1. The detailed design will not be discussed further; it can be found, for example, in the Applicant's aforementioned generic specification.

In addition to the design, known per se, of the sensor system, piezo actuators 4, of which two can be seen here, are now present. These are directly or indirectly connected to the sensor surface 1 and can introduce the surface vibration 5 already indicated above into the sensor surface 1. Depending on the desired haptic feedback from the sensor surface 1, this surface vibration 5 is now correspondingly adapted. If, for example, the haptic feedback of the roller 6, as explained in the illustration of FIG. 3, is to be generated, the vibrations are realized, for example, according to the diagram shown in FIG. 4, top right. This diagram shows the amplitude x of the surface vibration 5 over the path s of the swiping and/or rolling of the finger 3 or its fingertip over the sensor surface 1. This alternates between vibrations with different amplitudes in such a way that the frictional force FR of the finger 3 on the sensor surface 1 during its movement is set in the manner shown in FIG. 4, bottom right. This allows the mechanical behavior of the roller 6 to be realized relatively accurately as haptic feedback from the operating device 10 to the finger 3.

Figure 4:
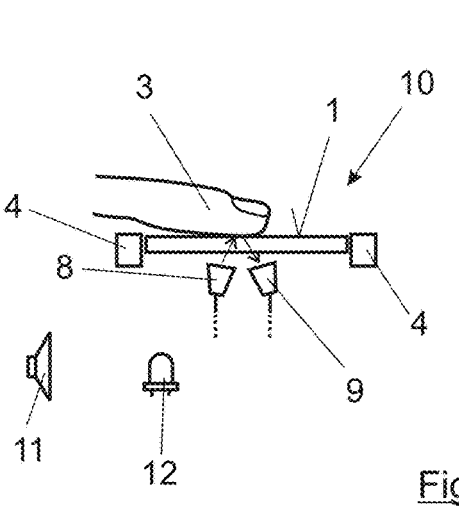
FIG. 4 shows the implementation of the exemplary embodiment from FIG. 3 in the operating element according to the invention.
Figure 4:
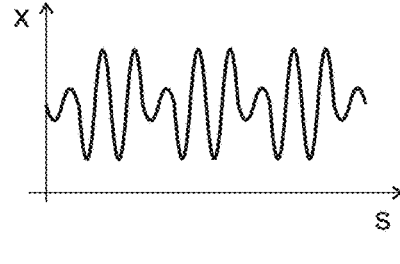
Figure 4:
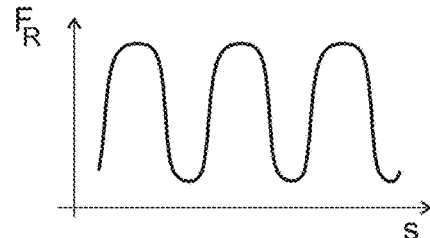

In addition to the purely haptic feedback via the surface vibration 5 of the sensor surface 1, a change in the surface vibration 5, for example a change in the vibration amplitudes, can also be indicated via acoustic and/or optical signals that supplement or accompany the haptic feedback. To indicate this, a loudspeaker 11 as a symbol for the additional possible acoustic feedback and an LED 12 (light-emitting diode) as a symbol for a possible additional optical feedback are indicated in FIG. 4 below the operating device 10 purely by way of example. In addition to pure light signals via the indicated LED 12, the optical feedback can also be provided via a display on a screen, for example by advancing through a menu located there and correspondingly displaying the next menu item as selected or the like. All of this would fall under the optical feedback for the purposes of this description.

With minimal installation space and without the need to install mechanical parts whose rotation or other movement must be detected, it is now very easy to combine an optical finger navigation sensor with reliable haptic feedback. The haptic feedback can be adjusted almost arbitrarily by adjusting the amplitude x and/or the frequency of the vibration, in order to adjust, for example, the aforementioned roller 6 or any other type of mechanical movement by varying the frictional force FR between the finger 3 and the sensor surface 1. In this way, for example, a roller 6, a button, a joystick, a trackball, or the like can be recreated in terms of its feedback by the haptic feedback generated by the surface vibration 5 in the sensor surface 1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method, comprising:

detecting an operating input performed by at least one finger by detecting various contact points of a contour of the at least one finger using a sensor system on a sensor surface, wherein the sensor system includes at least one transmitting unit configured to transmit a signal to the at least one finger and at least one receiving unit configured to receive a signal reflected by the at least one finger; and introducing, by at least one actuator, a surface vibration into the sensor surface to change a frictional resistance between the at least one finger and the sensor surface as a function of changing contact points of the contour of the at least one finger, wherein the surface vibration is temporally changed in such a way that a sequence of larger and smaller vibration amplitudes or frequencies is obtained in an area below the contact points of the at least one finger on the sensor surface.

2. The method of claim 1, wherein the temporal change in the surface vibration in the area below the contact points of the finger on the sensor surface is performed abruptly, continuously, or according to a predefined function, in each case to produce a corresponding haptic effect.

3. The method of claim 1, wherein the surface vibration is temporally changed in such a way that a frictional resistance is changed by a rise and fall of vibration amplitudes or frequencies in such a way that an effect of a roller rotatable in one or two dimensions with a detent of its rotational movement is haptically produced.

4. The method of claim 1, wherein an adaptation of the temporal change in the vibration amplitudes or frequencies occurs adaptively based on a path-time diagram of movement of the contact points of the contour of the at least one finger on the sensor surface, for which purpose the temporal change is increased at least in case of a movement that does not correspond to desired haptic effect.

5. The method of claim 1, wherein at least some of the temporal changes in the vibration amplitudes or frequencies are accompanied by acoustic or optical signals.

6. An operating device, comprising:

a sensor system configured to detect various contact points of a contour of a finger on a sensor surface, the sensor surface comprising a transmitting unit configured to transmit a signal to the finger and at least one receiving unit configured to receive a signal reflected by the finger, wherein at least two side edges of the sensor surface are each connected at least indirectly to at least one piezo actuator, wherein the at least one piezo actuator is configured to introduce a surface vibration into the sensor surface in such a way that a frictional resistance between the finger and the sensor surface changes as a function of the changing contact points of the contour of the finger, wherein the at least one piezo actuator is configured to temporally change the surface vibration in such a way that a sequence of larger and smaller vibration amplitudes or frequencies is obtained in an area below the contact points of the finger on the sensor surface.

7. The operating device of claim 6, wherein the at least two side edges of the sensor surface include two opposite side edges and two side edges of the sensor surface that are perpendicularly opposite thereto and each are at least indirectly connected to the at least one piezo actuator.

8. The operating device of claim 6, wherein the sensor surface is an optical finger navigation sensor or a fingerprint sensor.

9. The operating device of claim 6, wherein devices are provided that are configured to at least indirectly outputting acoustic or optical signals.

10. A method, comprising:

detecting, by a sensor system, various contact points of a contour of a finger on a sensor surface as an operating input, wherein the sensor system includes a transmitting unit that transmits a signal to the finger and a receiving unit receiving a signal reflected by the at least one finger; and temporally changing a frictional resistance between the at least one finger and the sensor surface by introducing, by at least one actuator, a temporally changing surface vibration into the sensor surface as a function of changing contact points of the contour of the at least one finger, wherein the temporally changing surface vibration includes at least a first surface vibration followed by a second surface vibration, wherein the first surface vibration has a larger amplitude or frequency than the second surface vibration.

11. The method of claim 10, wherein the second surface vibration following the first surface vibration haptically produces a detent of a roller rotatable in one or two dimensions.

12. The method of claim 10, wherein the temporal change of the surface vibration occurs adaptively based on a path-time diagram of movement of the contact points of the contour of the finger on the sensor surface to increase the temporal change when a movement of the finger does not correspond to a desired haptic effect.

* * * * *